United States Patent [19]

Mancuso, Jr.

[11] 4,422,574

[45] Dec. 27, 1983

[54] SPRAY ENROBER NOZZLE CONSTRUCTION WITH REMOVABLE AND INTERCHANGEABLE COMPONENTS

[75] Inventor: James Mancuso, Jr., Huntington Beach, Calif.

[73] Assignee: Par-Way Manufacturing Co., Costa Mesa, Calif.

[21] Appl. No.: 342,118

[22] Filed: Jan. 25, 1982

[51] Int. Cl.³ .............................................. B05B 15/02
[52] U.S. Cl. .................................... 239/118; 239/390; 239/424; 239/600
[58] Field of Search ............... 239/116, 117, 118, 424, 239/600, 526, 527, 596, 599, 390

[56] References Cited

U.S. PATENT DOCUMENTS

| | | | |
|---|---|---|---|
| 2,283,762 | 5/1942 | Robinson | 239/526 X |
| 2,296,079 | 9/1942 | Anderson | 239/118 |
| 3,619,830 | 11/1971 | Harris et al. | 239/526 X |
| 3,779,462 | 12/1973 | Bruninga | 239/390 X |
| 4,283,012 | 8/1981 | Hanson | 239/118 |

Primary Examiner—John J. Love
Assistant Examiner—Mary McCarthy
Attorney, Agent, or Firm—Fulwider, Patton, Rieber, Lee & Utecht

[57] ABSTRACT

In an enrober, a food ingredient spray apparatus includes a spray air tube and a first housing section defining an outer orifice connected to the air tube. A separately formed nozzle piece received by the first housing section defines an inner orifice within the outer orifice and communicates with an ingredient tube. To secure the nozzle piece and the ingredient tube in their respective positions, a second housing section is removably connected to the first housing section. A plurality of interchangeable nozzle pieces having different size inner orifices can be provided, along with a variety of corresponding plungers.

1 Claim, 4 Drawing Figures

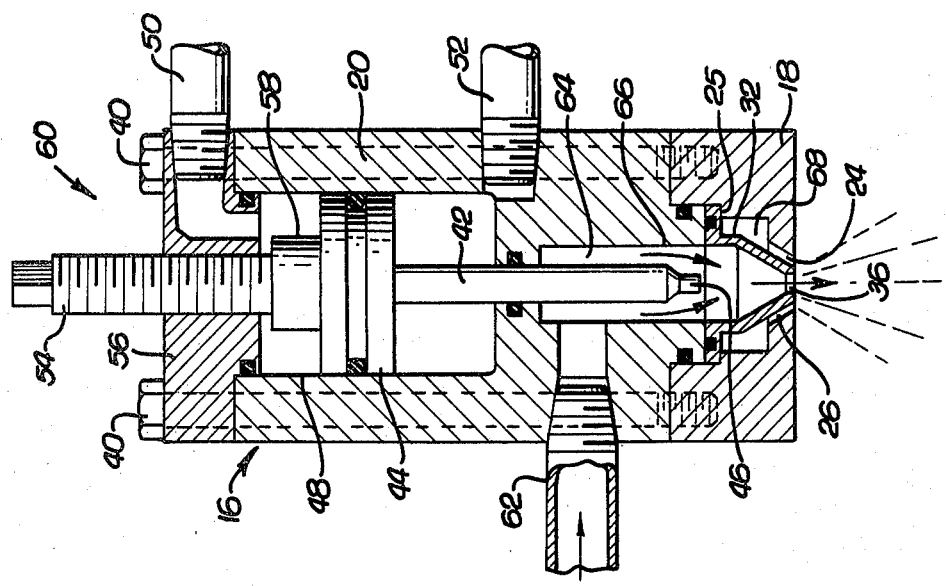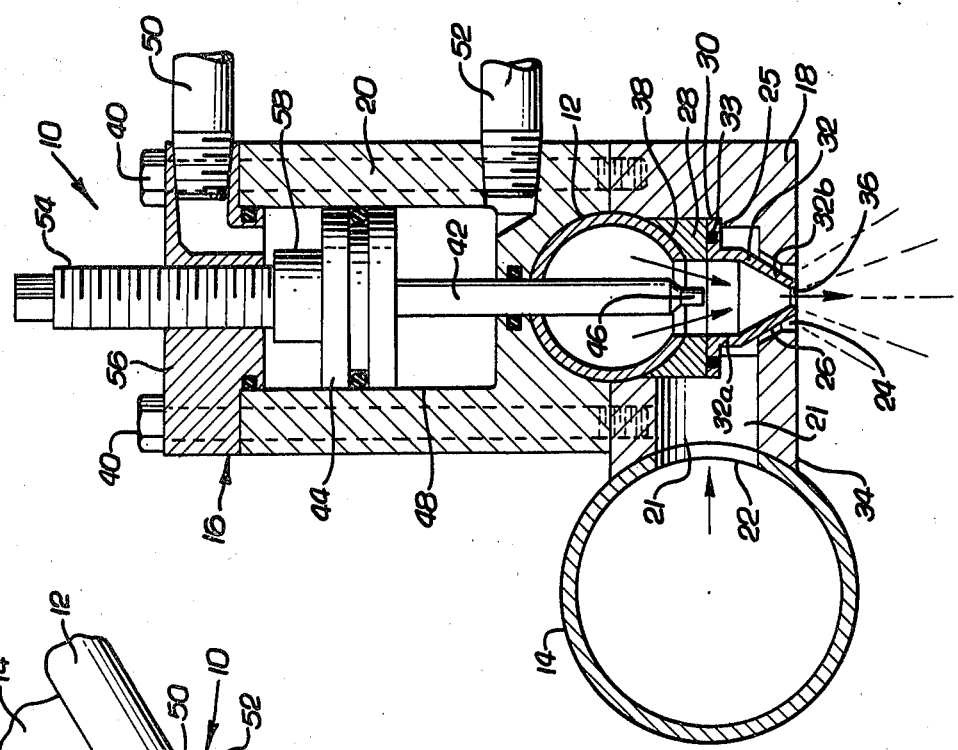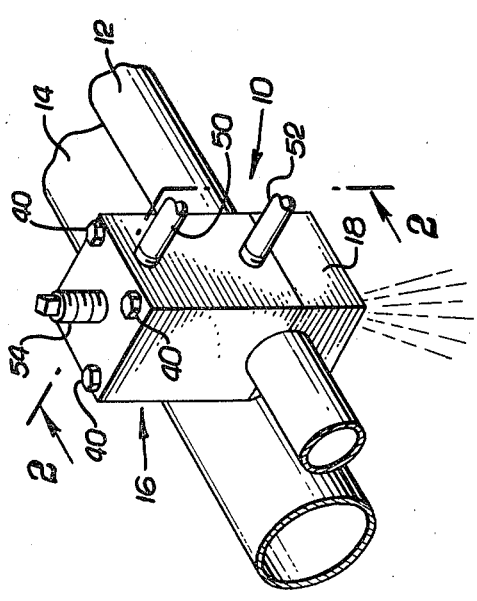

4,422,574

SPRAY ENROBER NOZZLE CONSTRUCTION WITH REMOVABLE AND INTERCHANGEABLE COMPONENTS

FIELD OF THE INVENTION

The present invention relates to enrobers for applying food ingredients and, more particularly, to a spray apparatus for such enrobers having an improved nozzle construction.

BACKGROUND OF THE INVENTION

Ingredients of food products, often in the form of a slurry, are sometimes sprayed onto an edible base or substrate. Examples of such sprayed ingredients are chocolate, cheese, sugar and various seasoning coatings for chips.

Spraying is usually accomplished by a device known as an enrober, and exemplary enrobers are described in U.S. Pat. Nos. 4,193,373 and 4,283,012. The enrober typically includes an array of nozzles so as to cover as many surface planes as desired. The overspray is constantly collected and recirculated.

Typically the ingredient is supplied from an ingredient tube to an inner orifice of each nozzle. Low pressure air flowing through a surrounding outer orifice propels the ingredient. Blockage of the inner orifice by accumulated and solidified ingredient is a recurring problem. One solution is to provide a cleanout plunger that periodically reciprocates into the inner orifice, as described in U.S. Pat. No. 4,283,012. However, it is still of great importance to be able to readily disassemble the nozzle rather completely for thorough periodic cleaning. Ease of disassembly is also important because of the need to inspect and replace worn components. Particularly in the case of more complex nozzles having cleanout plungers, it is difficult to arrive at an easily disassemblable construction.

The rate at which the ingredient is sprayed through a particular nozzle is not adjustable over a wide range. Generally, the principal parameter that can be varied to influence this rate is the air pressure, but the nozzle will not perform satisfactorily and the optimum spray pattern cannot be maintained if the pressure is changed substantially.

A principal objective of the present invention is to provide a spray apparatus for an enrober that is readily disassemblable for cleaning and for replacement of parts. Another objective is to provide such an apparatus in which the size of the inner orifice can be readily changed to adjust the rate of ingredient spray. Still another objective is to provide these advantages in an apparatus that includes a reciprocating cleanout plunger.

SUMMARY OF THE INVENTION

The present invention accomplishes the above objectives. It resides in an enrober for applying an ingredient spray to food products in which the spray apparatus includes a spray air tube for carrying spray air to assist in the spraying of a food ingredient, a first housing section defining an outer orifice, and an air conduit connecting the air tube to the outer orifice. A separately formed nozzle piece received by the first housing section defines an inner orifice within the outer orifice, and an ingredient tube supplies the ingredient to the inner orifice. All these components are secured in their respective positions by a second housing section that is removably connected to the first housing section.

According to another aspect of the invention, a plurality of interchangeable nozzle pieces are provided having different size inner orifices. Each nozzle piece corresponds to a different approximate spray rate or range of spray rates, assuming a particular ingredient viscosity, and has a corresponding plunger. An advantageous nozzle piece construction has a ring-shaped portion from which a partially conical orifice defining portion depends. It can be held by a shoulder defined by the first housing section.

A cleanout plunger can be arranged to extend through the ingredient supply tube into the nozzle piece. Pneumatic means for causing reciprocation of the plunger can be disposed within the second housing section along with a mechanism for adjusting the home position of the plunger.

Other features and advantages of the present invention will become apparent from the following detailed description, taken in conjunction with the accompanying drawings, which illustrate, by way of example, the principles of the invention.

BRIEF DESCRIPTION OF THE DRAWINGS

FIG. 1 is a perspective view of a spray apparatus portion of an enrober, constructed in accordance with the present invention;

FIG. 2 is a cross-sectional view of the spray apparatus of FIG. 1 taken along the line 2—2;

FIG. 3 is a fragmentary cross-sectional view, similar to a part of FIG. 2; and

FIG. 4 is a cross-sectional view, similar to FIG. 2, of another spray apparatus that also embodies the invention.

DESCRIPTION OF THE PREFERRED EMBODIMENT

A spray apparatus 10, constructed in accordance with the invention and shown in FIGS. 1 and 2, is connected to an ingredient tube 12 and a spray air tube 14. The apparatus 10 includes a generally rectangular housing 16 having a smaller first section 18 that forms a base and a larger second section 20 above.

The first section 18, as best shown in FIG. 2, is permanently secured to one side of the air tube 14 and defines an air conduit 21, extending perpendicular to the tube, by which the tube communicates through an opening 22 with a round outer orifice 24 in the bottom of the first section 18. The air can thus escape in a direction perpendicular to its flow through the tube 14 and the conduit 21.

A generally cylindrical recess is defined by the first section 18, extending upwardly from the outer orifice 24 and defining a shoulder 25 to receive a nozzle piece 26. The nozzle piece 26 includes a relatively flat ring-shaped portion 30 from which a centered inner orifice defining portion 32 depends downwardly into the outer orifice 24. This orifice defining lower portion includes a short cylindrical section 32a directly beneath the ring-shaped portion 30 followed by an inwardly tapered conical section 32b that ends flush with the bottom surface 34 of the first housing section 18. An inner orifice 36 is thus located at the center of the outer orifice 24, the remaining portion of the outer orifice forming an annulus. During normal operation of the device, the air from the tube 14 flows through the annular outer orifice 24 surrounding the nozzle piece 22 and carries with it ingredient that is presented at the inner orifice 36.

Above the nozzle piece 32 is an annular nozzle connector 28 having the same radial thickness as the ring-shaped portion 30 of the nozzle piece 30. A seal 33 is retained between the nozzle piece 32 and the connector 28 in a groove formed in the top of the nozzle piece. The upper surface 38 of the connector 28 (on the opposite side from the top of the ring-shaped portion 30) is concave and configured so as to snugly receive the transversely positioned cylindrical outer surface of the ingredient tube 12.

The second housing section 20 is likewise contoured to tightly receive the top half of the ingredient tube 12. It is removably connected to the lower housing section 18 by four long through bolts 40. Thus, the simple securement of the second housing section 16 by the bolts 40 holds all the various components mentioned above in position, pressing the ingredient tube 12 against the nozzle connector 28, which leans against the nozzle piece 32, which in turn is pressed against the shoulder 25.

The spray apparatus 10 also includes a vertically oriented cleanout plunger 42 which extends downwardly from a piston 44 through the ingredient tube 12 in alignment with the inner orifice 36. A tapered reduced diameter portion 46 at the lower end of the plunger 42 is configured and dimensioned to fit snugly within the inner orifice 36. To produce reciprocation of the piston 44 and the plunger 42, the piston is disposed within a pneumatic cylinder 48 defined by the second housing section 20. Two control air lines 50 and 52 are ported to the top and bottom, respectively, of the cylinder 48. Thus, compressed air can be introduced on either side of the piston 44 to cause reciprocation of the plunger 42.

When in the at rest or home position, shown in FIG. 2, the lower end 46 of the plunger 42 does not engage the nozzle piece 32 at the inner orifice 36. Periodically, however, pneumatic pressure is applied to the top of the piston 44 and removed from the bottom, causing the plunger 42 to move downwardly so that the lower end 46 of the plunger fits snugly into the inner orifice 36 and dislodges any ingredient residue that has accumulated on the inside of the nozzle piece 32.

The plunger 42 can also be used to modulate the ingredient flow by adjusting its home position downwardly until it restricts the flow of the ingredient into the inner orifice 36. This is accomplished by an adjustment member 54 threadedly received by a plate 56 that forms the top of the second housing section 16. An enlarged head 58 on the bottom of the adjustment member 54 normally contacts the top surface of the piston 44 at its center, directly opposite the attachment point of the plunger 42. Thus by turning the adjustment member 46, its position can be varied to selectively determine the uppermost position (the home position) to which the piston 44 can move when pressure is applied below the piston through the lower control air conduit 52.

A generally similar spray apparatus 60, shown in FIG. 4, in which similar components are indicated by the same reference numbers differs primarily in that the ingredient is not supplied by a relatively large tube 12 that extends through the housing 16. Instead, the ingredient is delivered by a relatively small branch tube 62 into a cylindrical cavity 64 that extends upwardly from the nozzle piece 32 into the bottom of the second housing section 20. There is no need for a nozzle connector 28, since the inner portion 66 of the second housing section 20 extends downwardly into full contact with the top surface of the ring-shaped portion 30 of the nozzle piece 28. Spray air is supplied through a conduit (not shown in FIG. 4) to a cavity surrounding the nozzle piece 28. This construction permits the shoulder 25 on which the nozzle piece 28 is seated to extend around the full circumference of the nozzle piece, which is not possible in the case of the apparatus 10 because of the air conduit 21.

It will be noted that in both embodiments of the present invention the apparatus is readily disassemblable for cleaning of all components, particularly the nozzle piece 28. In addition, it is possible to quickly and easily replace the nozzle piece 28 with another that defines a different size inner orifice 36, suitable for an ingredient of a different viscosity or for a different flow rate. A corresponding plunger 42' should also be installed that is shaped and dimensioned to mate with the new nozzle piece 28'. Thus, FIG. 3 shows the apparatus 10 of FIGS. 1 and 2 with a different nozzle piece 28' and plunger 42'. The plunger 42 and 42' may be integrally formed and changeable with the piston 44 or they may be separately removable components.

It will also be noted that the nozzle piece 28 and the plunger 42 may be subject to wear due to the granular nature of the ingredients and due to its periodic contact with the cleanout plunger 42. The components are, however, easily replaceable with a minimum of down time.

While a particular form of the invention has been illustrated and described, it will be apparent that various modifications can be made without departing from the spirit and scope of the invention.

I claim:

1. In an enrober for applying an ingredient spray to food products, an ingredient spray apparatus comprising:
   a spray air tube for carrying spray air to assist in the spray of a food ingredient;
   a first housing section defining a round outer orifice, a shoulder at least partially surrounding said outer orifice and an air conduit connecting said spray air tube to said outer orifice;
   a plurality of separately formed interchangeable nozzle pieces each having a ring-shaped portion adapted to be seated on said shoulder and an inner orifice defining portion that is at least partially conical depending from said ring-shaped portion and adapted to be disposed within said outer orifice;
   a second housing section removably secured to said first housing section;
   an ingredient tube for carrying said food ingredient, said ingredient tube extending between said first and second housing sections and defining an ingredient opening that communicates through an installed one of each nozzle pieces with said inner orifice thereof;
   a connection piece disposed between said nozzle piece and said ingredient tube;
   a sealing member disposed between said installed nozzle piece and said connection piece;
   a plurality of interchangeable cleanout plungers, each corresponding to one of said nozzle pieces and adapted to extend through said ingredient tube in alignment with said inner orifice;
   pneumatic means disposed within said second housing section for causing periodic reciprocation of said plunger; and
   means for adjusting the home position of said plunger with reference to said inner orifice.

* * * * *

UNITED STATES PATENT AND TRADEMARK OFFICE
CERTIFICATE OF CORRECTION

PATENT NO. : 4,422,574

DATED : December 27, 1983

INVENTOR(S) : James Mancuso, Jr.

It is certified that error appears in the above—identified patent and that said Letters Patent is hereby corrected as shown below:

In the claims:

Col. 4, line 53, delete "each" and insert -- said --

Signed and Sealed this

Twenty-fourth Day of July 1984

[SEAL]

Attest:

GERALD J. MOSSINGHOFF

Attesting Officer

Commissioner of Patents and Trademarks